Patented Nov. 27, 1923.

1,475,473

UNITED STATES PATENT OFFICE.

THEODORE B. DRESCHER, OF ROCHESTER, NEW YORK, ASSIGNOR TO BAUSCH & LOMB OPTICAL COMPANY, OF ROCHESTER, NEW YORK, A CORPORATION OF NEW YORK.

LENS AND BLANK THEREFOR AND METHOD OF MARKING IT FOR THE PURPOSE OF IDENTIFICATION.

No Drawing. Application filed November 25, 1921. Serial No. 517,476.

*To all whom it may concern:*

Be it known that I, THEODORE B. DRESCHER, of Rochester, in the county of Monroe and State of New York, have invented certain new and useful Improvements in Lenses and Blanks Therefor and Methods of Marking Them for the Purpose of Identification; and I do hereby declare the following to be a full, clear, and exact description of the same.

My present invention relates to lenses and lens blanks, and particularly ophthalmic lenses and the blanks from which they are made, and has for its object to provide such articles with marks or characters which will enable them to be identified at all times whether completed or in such form as to require a further manipulation or treatment to adapt them for the particular purpose intended.

Heretofore considerable difficulty has been experienced by manufacturers of lenses and lens blanks in placing designating, identifying or trade marks upon them in such manner that, whether the lenses are completed or the lens blanks are finished with one surface ground and polished, the product of a particular manufacturer can be recognized and distinguished. Unless such a trade or designating mark is ineradicably marked in the article itself, there is a liability that unscrupulous dealers may pass off on the public or substitute the product of one manufacturer when those of another are called for or desired, but by the invention hereinafter described this is prevented by causing the designating mark or design to be formed in the glass of which the lens or blank is composed in such manner that while it does not interfere with the purpose for which the article is intended, namely, the free passage and refraction of light rays, it nevertheless serves as an identifying means under all circumstances.

In carrying out my invention I utilize in a commercial way the fact well known to those skilled in the art, that the light transmitting properties of glass and particularly of optical glass used in the manufacture of lenses, can be altered or modified slightly by subjecting it to the action of the rays emanating from a vacuum tube through which a current of electricity is passed embodying an anode or terminal of metallic tungsten and a cathode consisting of a tungsten spiral electrically heated. The precise action of such rays upon the glass is not very well understood but it is believed they affect chemically the metallic oxides, such as manganese, employed in the composition of the glass so as to render the portions thus affected visible by imparting to them a slight and usually a violet color, which however, when not very deep in tone does not appreciably detract from the refracting powers of the lens or its light transmitting properties. The composition of the glass is affected all the way through from the incident to the emergent surface so that the markings cannot be removed by subsequent grinding or polishing operation. I have found that an ophthalmic lens for correcting defects in vision, such as spectacle lens, is quite as efficient when a limited portion or portions of the glass of which it is composed have been subjected to the action of the infra-red or ultra violet rays whichever may produce the effect, emanating from such a tube to alter or modify a portion of the composition slightly or sufficient to render the mark visible under some circumstances. I am unable to state whether this characteristic of non interference with the normal use of the lens is due to the peculiar tint of the altered or modified portion but I have, by practical use, found it to be as stated.

Ophthalmic blanks and lenses are placed upon the market by the manufacturer in three ways (1) in the form of plain blanks of fine optical glass, (2) with one surface only ground and polished so that the optician may finish the other surface and (3) in the form of lenses with both surfaces finished, that is ground and polished. Such blanks or lenses may have embodied in their substance, the trade mark or designating mark as a design or initials indicating the manufacturer, by placing over one of their surfaces a mask or stencil formed of a material such as lead that is impermeable to the rays which affect the composition of the glass whether ultra-violet or infra-red, said stencil having portions cut away or removed to form an opening corresponding to the design or mark to be applied and permitting the emanations from a vacuum tube, such as described, to fall upon the lens through the open spaces and excluding them from the parts covered by the mask. By this means the material of the lens will be modified or altered clear through from one surface to the other. The length of time to which the glass is subjected to these rays, is comparatively slight, say only a few seconds, so that while a very faint violet or purple image is formed which is visible upon certain methods of inspection only, such as placing it upon a white surface this discoloration is imperceptible to the person using the lenses in the ordinary way. It is obvious that with the designating or trade mark thus indicated or marked in the glass itself and clear through its substances it cannot be removed by alteration of the surfaces as in grinding and polishing the lens or lens blanks to suit the peculiarities of the patient, and yet the lenses or blanks made by a particular manufacturer can be readily distinguished.

While the invention is particularly adapted for use in connection with ophthalmic lenses and lens blanks as these are not provided with tubes, shells or holders, which could be readily marked with a trade mark, it can nevertheless be utilized to inevitably mark or designate other kinds of lenses, as for instance telescopic or photographic objectives or eye pieces in which the mark may be placed in some position where it would not materially or unduly affect the light transmitting properties of the lens nor its refracting power.

I claim as my invention:

1. A transparent refracting lens of glass having a portion of the material of which it is composed slightly modified or altered in the form of a designating mark less in area than the surfaces thereof, said marking or tinting extending through the lens from one surface to the other.

2. A transparent refracting lens of glass having a portion of its substance chemically altered, modified or tinted in the form of a designating mark less in area than the surfaces of the lens but extending from the incident to the emergent surface thereof, the amount of said alteration being insufficient to materially interfere with the light transmitting or the refracting power of the lens.

3. The hereindescribed method of marking glass lenses and blanks therefor for identification purposes consisting in slightly altering or modifying the glass of which they are composed from one surface to the other in definite designs by subjecting limited portions thereof corresponding to the design desired, to the rays projected from an electrically excited vacuum tube the duration of the exposure being only sufficient to render the design perceptible but without appreciably affecting the light transmitting or refracting powers of the lens or blank.

THEODORE B. DRESCHER.